United States Patent [19]

Morton

[11] 3,763,357

[45] Oct. 2, 1973

[54] THRESHOLD CIRCUIT FOR CONVERTING A VIDEO SIGNAL TO A BINARY VIDEO SIGNAL

[75] Inventor: Roger R. A. Morton, Penfield, N.Y.

[73] Assignee: Bausch & Lomb Incorporated, Rochester, N.Y.

[22] Filed: Dec. 22, 1971

[21] Appl. No.: 201,219

Related U.S. Application Data

[63] Continuation of Ser. No. 78,769, Oct. 7, 1970, and a continuation-in-part of Ser. No. 835,673, June 23, 1969.

[52] U.S. Cl. ..... 235/92 PC, 235/92 R, 340/146.3 AC

[51] Int. Cl. .......... G06m 11/02

[58] Field of Search .......... 235/92 PC; 340/146.3 AC

[56] References Cited

UNITED STATES PATENTS 3,557,352 1/1971 Hogg .......... 235/92 PC

*Primary Examiner*—Maynard R. Wilbur
*Assistant Examiner*—Robert F. Gnuse
*Attorney*—Frank C. Parker

[57] ABSTRACT

In a particle measuring system wherein a particulate sample is measured by operating on and with a video signal derived from a television camera which scans the sample, a trimodel threshold circuit for converting the sloping transitions of the video signal to a binary video signal having sharply defined transitions which occur substantially at and generally coincide with the particle boundaries of the sample being scanned.

14 Claims, 9 Drawing Figures

ROGER R. A. MORTON
INVENTOR.

BY
SAUL A. SEINBERG

ATTORNEY

ROGER R. A. MORTON
INVENTOR.

BY
SAUL A. SEINBERG

ATTORNEY

ROGER R. A. MORTON
INVENTOR.

BY

SAUL A. SEINBERG
ATTORNEY

ROGER R. A. MORTON
INVENTOR.

BY
SAUL A. SEINBERG
ATTORNEY

ROGER R. A. MORTON
INVENTOR.

BY
SAUL A. SEINBERG
ATTORNEY

ROGER R. A. MORTON
INVENTOR.

BY
SAUL A. SEINBERG

ATTORNEY

ROGER R. A. MORTON
INVENTOR.

BY
SAUL A. SEINBERG
ATTORNEY

ROGER R. A. MORTON
INVENTOR.

BY
SAUL A. SEINBERG

ATTORNEY

THRESHOLD CIRCUIT FOR CONVERTING A VIDEO SIGNAL TO A BINARY VIDEO SIGNAL

CROSS-REFERENCES TO RELATED APPLICATIONS

This is a continuation application, of application Ser. No. 78,769, filed Oct. 7, 1970, and a continuation-in-part of my patent application, Ser. No. 835,673, entitled "Methods and Apparatus for Determining the Quantity and/or Other Physical Parameters of Objects," filed on June 23, 1969, and assigned to the asignee of the present invention.

BACKGROUND OF THE INVENTION

1. Field of the Invention

This invention relates to apparatus for determining the quantity and/or other physical parameters of particles, images thereof or image patterns lying within range of a scanning device and, more particularly, to a threshold circuit which enables substantially precise determination of the location of the boundaries of the objects being scanned and measured.

2. Description of the Prior Art

Detection and analysis of particulate materials is a necessity spanning a broad spectrum of scientific, engineering and industrial disciplines. Various types of systems have been either proposed or actually used in measuring the quantity and/or physical parameters of a group of regularly or randomly oriented particles of various size and shape. This application is concerned with and directed at certain problems associated with those particular prior art systems which employ a scanning device, such as a television camera, as a primary tool in making the desired measurements.

As is known to those having skill in the television art, the video signal derived from a television camera is one of varying amplitude, the highest amplitude corresponding to the whitest portions of the field of view and the lowest amplitudes corresponding to the darker portions thereof. This is the manner in which the video signal is transmitted using a positive polarity of transmission. The results are opposite, of course, for negative polarity transmission. It will be assumed that for purposes of this discussion and in the remainder of the application that positive polarity transmission is employed.

In making measurements of particulate samples it is understandably important for the sake of accuracy to be able to fix with certainty the location of each particle boundary. However, the video signal generated as a result of scanning the particulate sample does not accurately define the boundaries or edges of a particle or an image thereof due to inherent nonlinearities in the camera. This problem is further aggravated in particle measurement by the lack of contrast between the particles themselves and the background or by a gradual, rather than abrupt, contrast transition between the particles and the background. Consequently, at the particle boundaries, transitions in the video signal reflecting a sweep of the scanning device thereacross, are generally sloped and gradually round off to upper and lower limits, that is the white and black levels repectively, of the video signal. Under such conditions, correct determination of the boundary locations is difficult, if not impossible.

The prior art threshold circuits which generate an output signal when the input video signal level reaches a predetermined level failed to solve these problems since it was only fortuitous if the boundary transitions coincided with their conduction level. Due to the wide range of particle to background contrast which exists from sample to sample, and even within a particular sample itself, the prior art threshold circuits proved unsatisfactory for use in particulate sample measuring systems which employ a scanning device.

SUMMARY OF THE INVENTION

A primary object of the present invention is to provide a threshold circuit for use in a particle measuring system which employs a scanning device which will develop a binary signal having transitions occurring substantially at and generally coinciding with the boundaries of the sample being measured.

It is also an object of the present invention to provide such a threshold circuit having three modes of operation — manual, semi-automatic and automatic.

It is a further object of the present invention to provide such a versatile threshold circuit which will yield satisfactory results regardless of the relative shading or "color" of the sample or background.

Accordingly, there is provided a threshold circuit for detecting that point on the slope of a video signal which is indicative of the traverse of a particle boundary by the scanning device which generates the video signal and for producing a binary video signal having transitions occurring sustantially at each boundary point.

In performing this function, the threshold circuit operates in one of three possible modes. In the first or manual mode, a predetermined image intensity level is manually set to determine the points at which the binary video signal transitions occur. This manual reference level is determined by the operator.

The second mode of operation is termed semi-automatic and here also, the operator determines the threshold level at which the system will respond. However, a binary video signal transition does not occur merely when the video signal reaches the threshold level set by the operator. Instead, this threshold level is used to indicate to the system that when the video signal has crossed thereover, it is in the vicinity of a point at which a binary video transition is required. In the semi-automatic mode, the threshold level at which the binary video transitions occur is determined by averaging or otherwise weighting the maximum and minimum values attained by the video signal in the immediate vicinity of the operator-set threshold level crossover. Once the operator has manually set the initial threshold level, the remainder of the determination of binary video transitions is automatic, hence the name semi-automatic.

The final mode of operation of threshold circuit is the automatic mode. Once the threshold circuit has been switched into this mode of operation, there is no further control over this function. In the automatic mode, the binary video transitions occur at the average level of the maximum and minimum values of any video signal transition which exceeds a certain magnitude and slope.

DESCRIPTION OF THE PREFERRED EMBODIMENT

Figure 1:
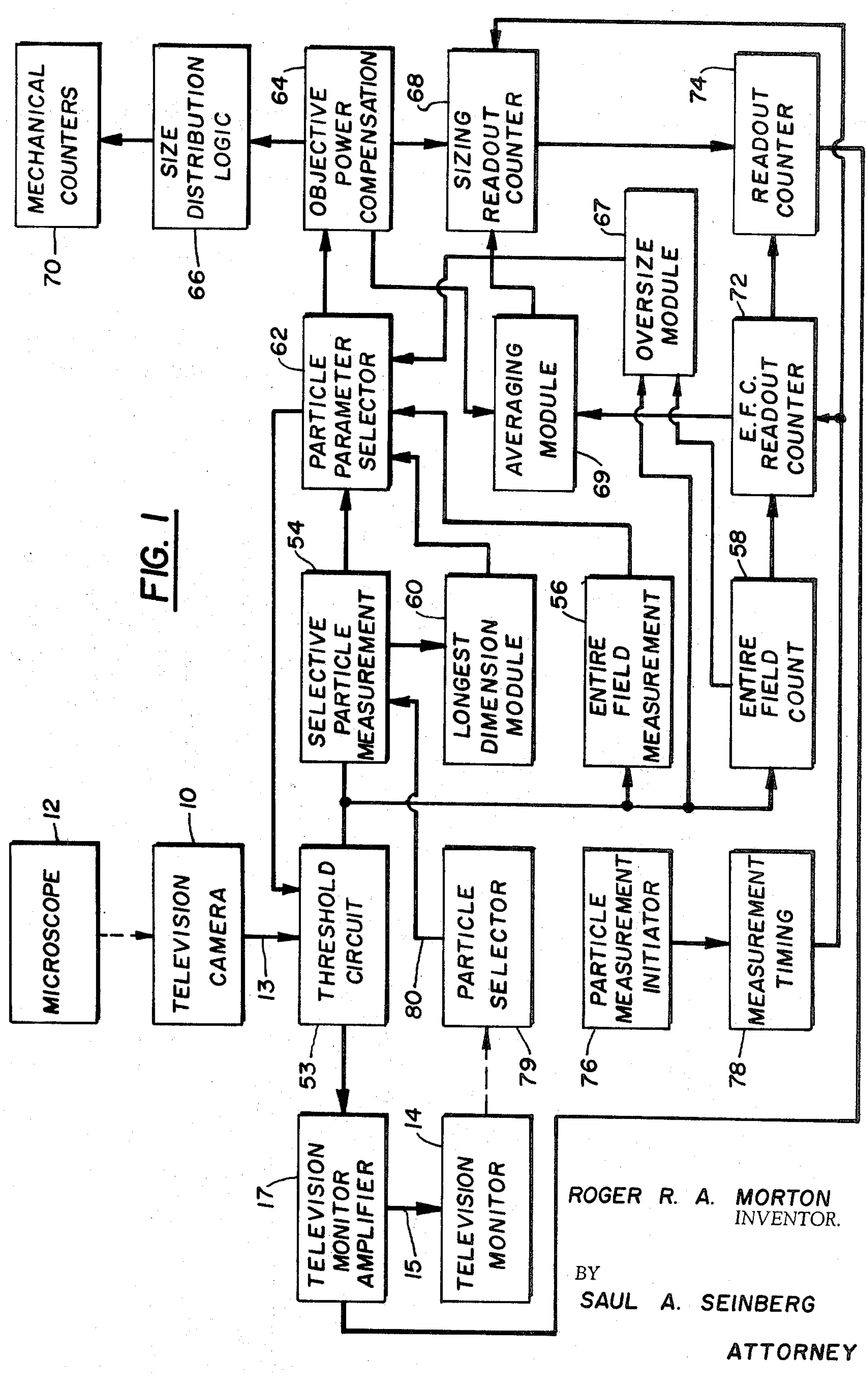
FIG. 1 is a functional block diagram of a system embodying the present invention.

Referring now to the drawings wherein like reference numerals have been employed in the several views for like elements, FIG. 1 illustrates a block diagram of a system which utilizes the present invention. Since this description is directed solely at the details of threshold circuit 53 shown in FIG. 1, reference should be had to the above-noted, earlier filed copending application, Ser. No. 835,673, for details concerning the overall system.

Figure 2:
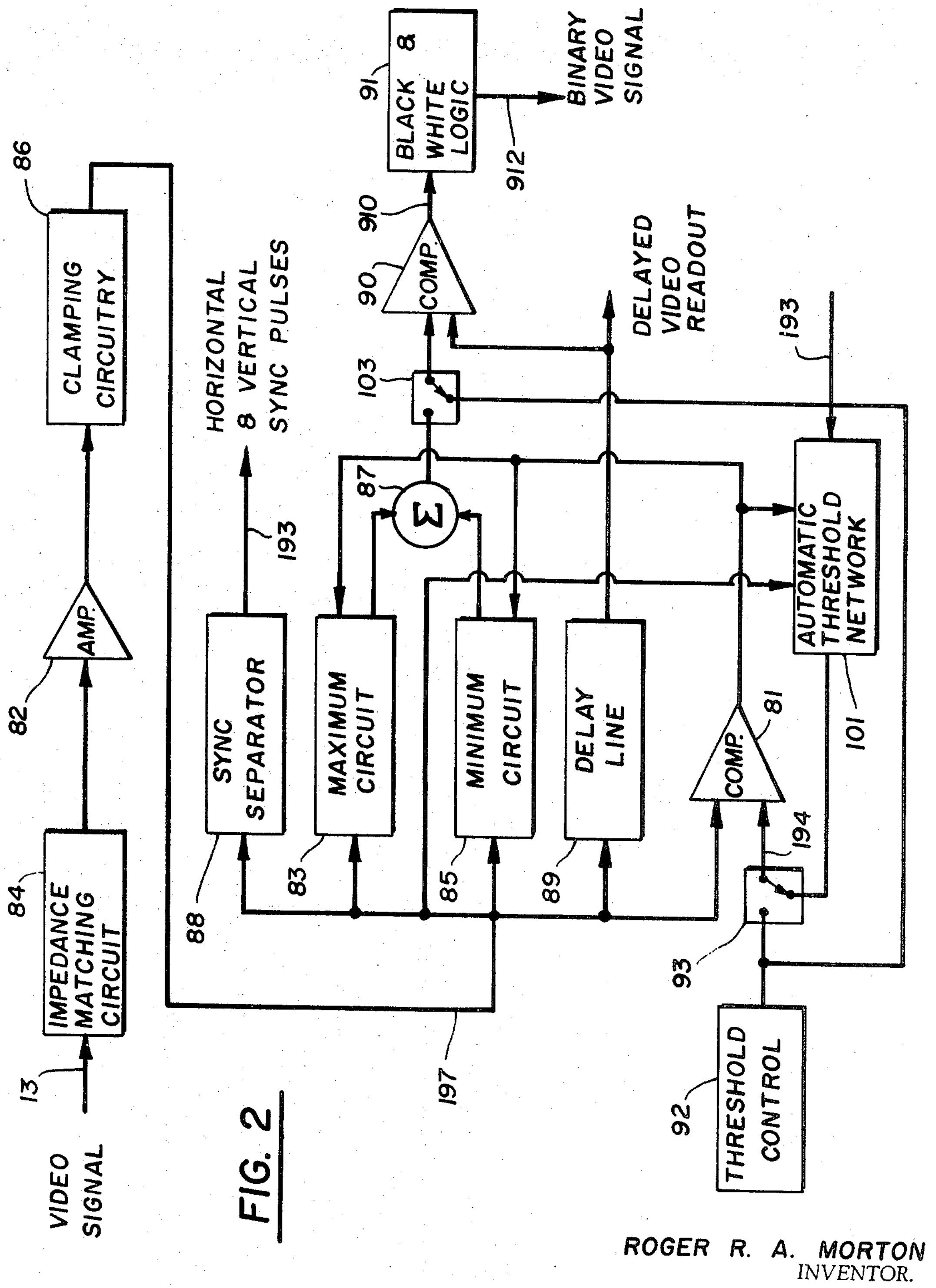
FIG. 2 is a block diagram of the threshold circuit shown in FIG. 1.

FIG. 2 is a block diagram of the threshold circuit 53 shown in FIG. 1. The primary function of this circuit is to develop a binary video signal having transition points which substantially coincide with the traverse of the particle boundaries within the measured sample by the scanning device 10. In performing this function, the the threshold circuit 53 operates in one of three possible modes. In the first or manual mode, a predetermined image intensity level is manually set to determine the points at which the binary video signal transitions occur. This manual reference level is determined by the operator, who adjusts a threshold control 92, preferably a potentiometer (not shown), located on the front panel of the apparatus to set the image intensity reference level. The second mode of operation is termed semi-automatic and here also, the operator determines the threshold reference level at which the system will respond. However, a binary video signal transition does not occur merely when the video signal reaches the threshold reference level set by the operator. Instead, this level is used to indicate to the system that when the video signal has crossed thereover, it is in the vicinity of a point at which a binary video transition is required. In the semi-automatic mode, the threshold level at which the binary video transitions occur is determined by averaging or otherwise weighting the maximum and minimum values attained by the video signal in the immediate vicinity of the operator-set threshold reference level crossover. Once the operator has manually set the initial threshold level, the remainder of the determination of binary video transitions is automatic, hence the name semi-automatic. The final mode of operation of threshold circuit 53 is the automatic mode. Once the operator has switched the threshold circuit 53 into this mode of operation, he has no further control over this function. In the automatic mode, the binary video transitions occur at the average or weighted level of the maximum and minimum values of any video transition which exceeds a certain magnitude and slope.

As illustrated in FIG. 2, the video signal produced by television camera 10 is fed directly to an impedance matching circuit 84. This circuit serves to match the output impedance of the television camera 10 and the video cable 13 which brings the positive video signal into the threshold circuit 53. The video signal is amplified and inverted by amplifier 82 and the output is fed to clamping circuitry 86 where the bottom of the horizontal sync pulses contained in the video signal are clamped to a fixed D.C. level. The clamping action of circuit 86 sets one of the limits to which the video signal may swing.

The amplified, clamped negative video signal is then fed, via suitable wiring 197, to comparator 81. It is this comparator which is used in the automatic mode to determine when a transition is to take place in response to video signals having a greater magnitude and slope than predetermined values. In the semi-automatic mode, comparator 81 determines when the video signal crosses the image intensity reference level preset by the threshold control 92 which reference signal appears on line 194 as an input to comparator 81. In the automatic mode, input 194 to comparator 81 is switched from threshold control 92 to the output of the automatic threshold network 101 by switch 93. In the manual mode of operation, comparator 81 plays no role at all.

The video signal is also fed to the maximum circuit 83 and the minimum circuit 85. These two circuits only function in the automatic and semi-automatic modes of operation and determine the maximum and minimum values reached by the video signal in the neighborhood of where comparator 81 has switched. To be more specific, consider the operation of the maximum circuit 83.

The video signal enters this circuit together with the output of comparator 81. If this output is positive or "up," the maximum circuit 83 clamps down onto the video signal and follows it up until the peak value of the video signal is reached. This peak signal value is stored until the next positive-going transition by comparator 81. At a negative-going transition by comparator 81, the maximum circuit outputs the most positive voltage reached since the last positive-going transition. Minimum circuit 85 provides similar information or output as the maximum circuit 83, except that all polarities are reversed. The respective outputs of the maximum and minimum circuits 83 and 85 are passed to a summing network 87 which determines the instantaneous weighted average of the outputs of the maximum and minimum circuits. It is this voltage output by summing network 87 which is used to determine the threshold level for comparator 90.

The other input to comparator 90 is a delayed version of the video signal which appears on line 197. As is schematically shown in FIG. 2, the video signal is delayed by delay line 89 for a period in the order of 1.0 microseconds. The purpose of the delay is to provide sufficient time for the maximum and minimum circuits 83 and 85 to determine the respective upper and lower values of the video signal before the instant at which a transition is to occur and for summing network 87 to determine the weighted average thereof.

Comparator 90, consequently, switches whenever the delayed video signal crosses the midpoint or some other point, as determined by the weighted average, of the maximum and minimum voltages of a transition selected by comparator 81, whether the instrument is in the automatic or semi-automatic mode. In the manual mode, on the other hand, comparator 90 switches at a D.C. level determined by the threshold control 92. Switch 103 is set in accordance with the selected mode of operation to thereby provide comparator 90 with the proper input.

Figure 3:
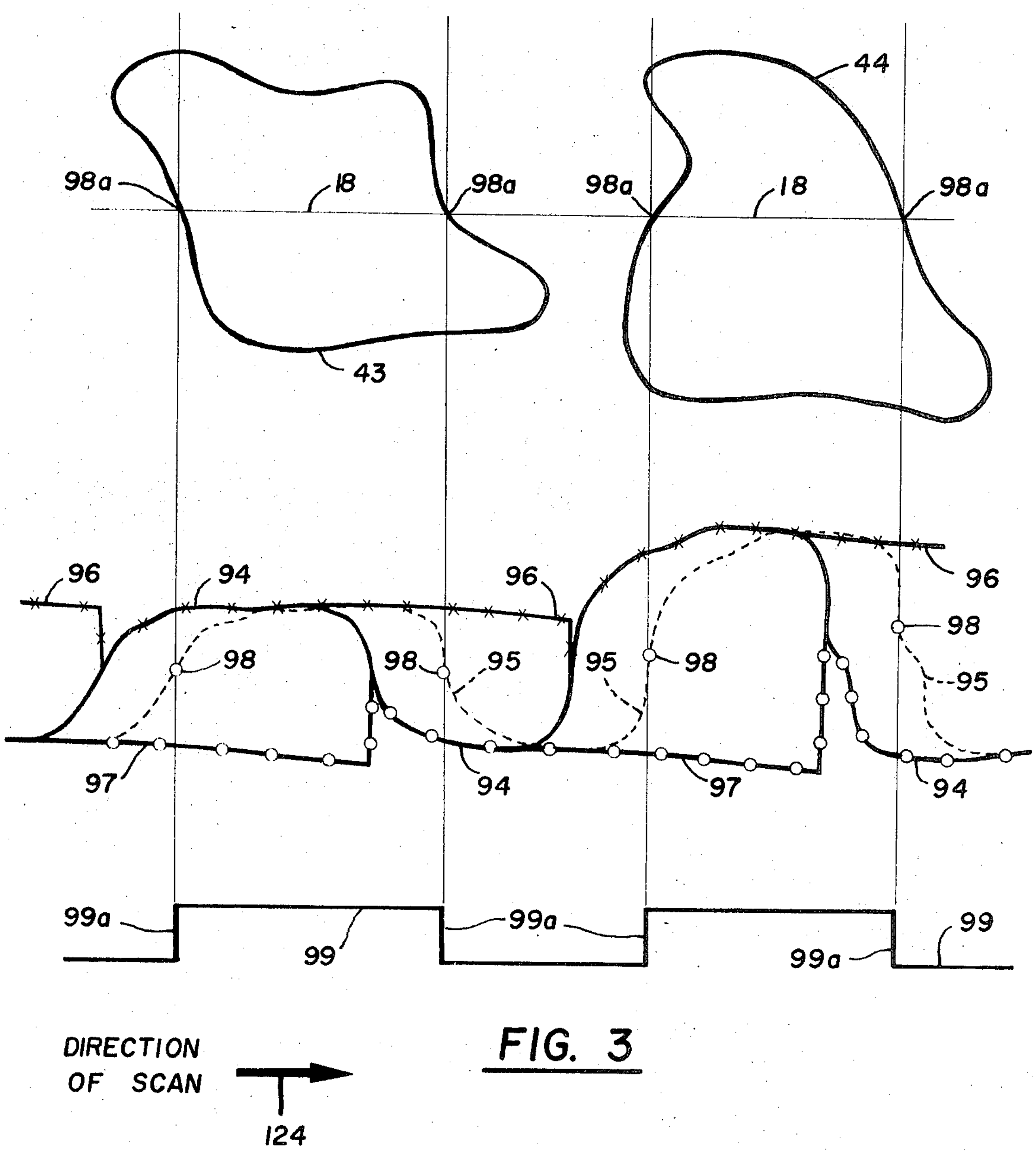
FIG. 3 is a time-based plot of the video and binary video signals developed by scanning the illustrated particles with a scanning device.

An understanding of the operation of threshold circuit 53 will be enhanced by reference to FIG. 3 wherein the relationship of the various signals and the particles from which they are derived is illustrated. The video signal developed by camera 10 is shown as a solid line 94 and is derived by the traverse along scan line 19 across particles 43 and 44. It should be noted, as illustrated in FIG. 3, that the transitions of the video signal 94 are not sharp, but instead are sloped and gradually round off to an upper or lower limit. The purpose of threshold circuit 53, as previously noted, is to detect that point on the slope of video signal 94 which corresponds to the actual particle boundary and to produce, in a manner to be hereinafter explained, a binary video signal 99 having sharp transitions occurring at the boundary points. The delayed video signal, which is outputed from delay line 89 and constitutes one of the inputs to comparator 90, is illustrated as a dashed line 95 which is shifted to the right of video signal 94 by the effect of delay line 89. The maximum and minimum signals, indicated by reference numerals 96 and 97 respectively, represent the highest and lowest values reached by the video signal during a transitionary period. Maximum signal 96 is represented by a solid line having crosses superimposed thereupon. Minimum signal 97 is represented by a solid line having spaced circles superimposed thereupon. Note that the maximum signal 96 is pulled down to the video signal 94 close to the beginning of the leading edge of a video signal transition. The minimum signal 95 conversely is pulled up to the video signal close to the start of the trailing edge of a video signal transition. This is done to insure that the maximum nd minimum determinations accurately and quickly reflect the highest and lowest values reached by the video signal 94 and are not erroneously influenced by signal drift. When the various transition points 98 have been determined, comparator 90 switches when the video signal crosses the level determined by summing circuit 87, thereby generating the corresponding binary video signal 99. The width or duration of each binary video pulse corresponds to the time interval between successive midpoints 98. The correspondence between transition points 98, the transitions of the binary signal 99, and the particle boundaries 98a should be noted. While this correspondence is not always exact, as is illustrated in FIG. 3 for the sake of simplicity, it will be appreciated that substantial correspondence is, in fact, achieved or optimized through use of the present invention.

The binary video signal 99 produced by the switching action of comparator 90 is fed to a black and white logic circuit 91. In this circuit, the binary video signal 99 is either inverted or maintained at its same polarity depending on the relative shading or contrast between the particles and their background. While an alternative scheme could be easily implemented, it is preferred to pass the binary video signal unchanged through logic circuit 91 when a "black" particle on a "white" background is being measured. A "white" particle on a "black" background will result in an inversion of the binary video signal by logic circuit 91. A switch (not shown) located on the front panel of control center 16 allows the operator to set logic circuit 91 in accordance with the relative "color" of the objects and background being scanned. The final output of the threshold circuit 53 is, therefore, a binary video signal 99 which is positive when the electron beam of camera 10 is scanning over a particle and zero when the beam is scanning over the sample background regardless of the relative shading or " color" of the background and objects being measured.

Separator 88 serves to "separate" out the horizontal and vertical sync pulses from the video signal for use as timing pulses elsewhere in the system. As will be realized by those familiar with the television art, the act of "sync separation" produces a train of horizontal and vertical sync pulses. Separator 88 does not functionally form a portion of threshold circuit 53. It is, however, physically located the circuit boards which comprise the threshold circuit 53 since it is obviously convenient to locate separator 88 in close proximity to a point where the unaltered video signal may be sensed.

Figure 4:
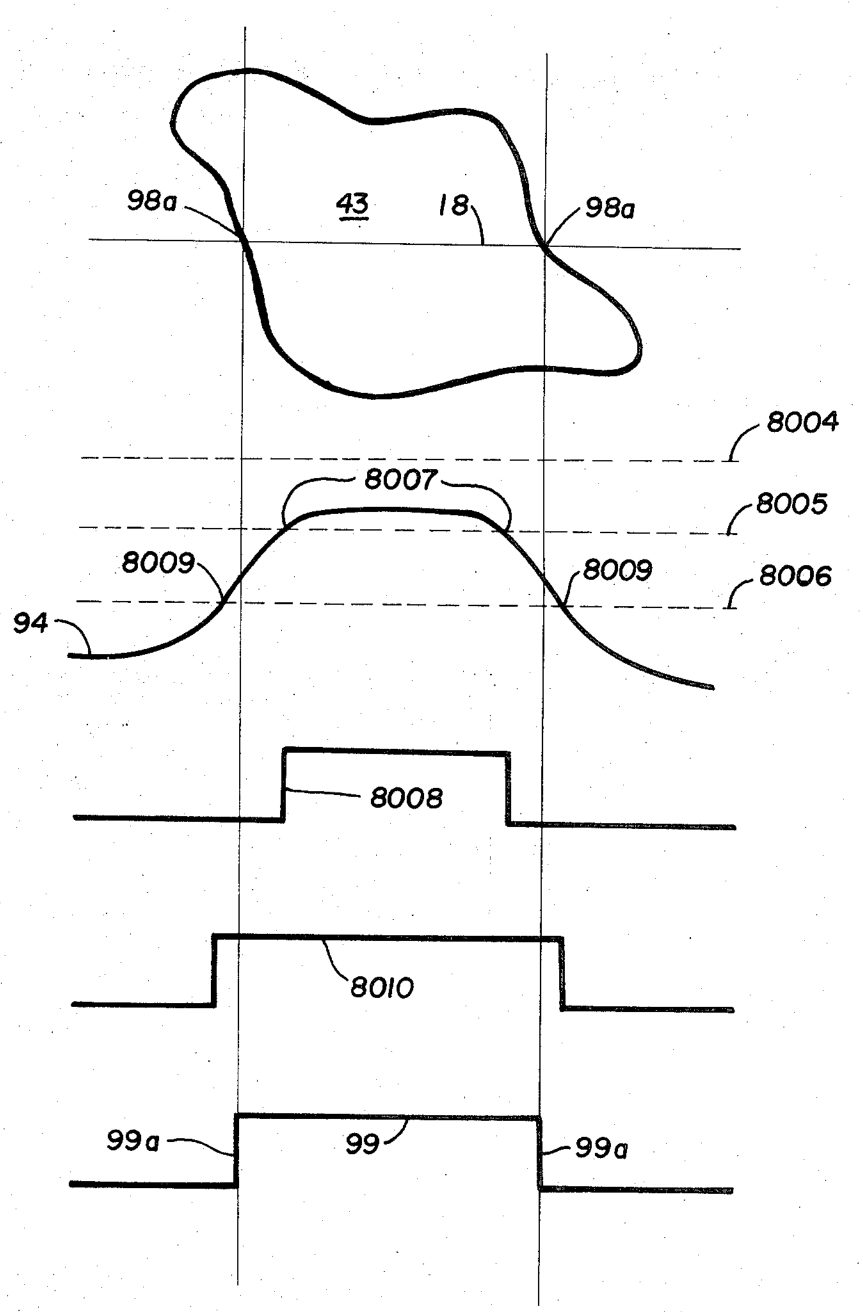
FIG. 4 is a schematic diagram of the threshold circuit shown in FIG. 2.

In the manual mode of operation of threshold circuit 53, a particle boundary is defined as occurring at a particular intensity level by causing the binary video signal transitions 99*a* to occur where the selected intensity level intercepts the video signal 94. The intensity level is, in fact, a d.c. voltage whose value is determined by the threshold control 92 output which is set by the operator. FIG. 4 illustrates this operation. If the d.c. level is set to 8004, then the video signal 94 does not intercept it and no changes will occur in the binary video signal 99. If the d.c. threshold level is set to 8005, then the video signal 94 intercepts this level at points 8007 producing binary video signals 8008. If instead, the d.c. level is set to a lower value 8006, the image is detected at transition positions 8009 giving rise to binary video signal 8010. Thus, the manual mode of operation results in a change in the position of the detected boundaries as the threshold level is adjusted.

It is obviously desirable to be able to discriminate between particles of differing contrast by merely adjusting threshold control 92. However, the variation in the position of the binary video signal transitions 8007 and 8009, if the threshold level is changed within the range of contrast of a particular image, is undesirable. Consequently, more exact apparatus for producing a binary video signal 99 having transitions which substantially or exactly correspond with the boundary points of a particulate sample is needed in order to achieve minimum measuring error.

In order to overcome the above-noted difficulties of manual operation of threshold circuit 53, which difficulties are also present in similar prior art apparatus, two additional modes of operation are provided. In the semi-automatic mode of operation, only those images whose video signal intercepts the threshold level set by the operator produce a binary video signal, as in the manual mode of operation. However, unlike the results obtained in the manual mode, the positions of the binary video transitions resulting from semi-automatic operation are largely independent of the interception points between the video signal and the d.c. threshold level set by the operator. The details of operation in the semi-automatic mode are set forth below.

The third and final mode of operation is the automatic mode. This mode of operation is intended to detect images which appear on a generally uniform background. If these images have more than a certain contrast difference with respect to the background and if their edges or boundaries are sufficiently sharp, the threshold circuit 53 will automatically generate a binary video signal which is substantially or exactly representative of the sample. The operator has no control over the contrast of the images selected. In addition, the background may exhibit shading and other gradual variations and still not affect operation of threshold circuit 53.

Figure 5A:
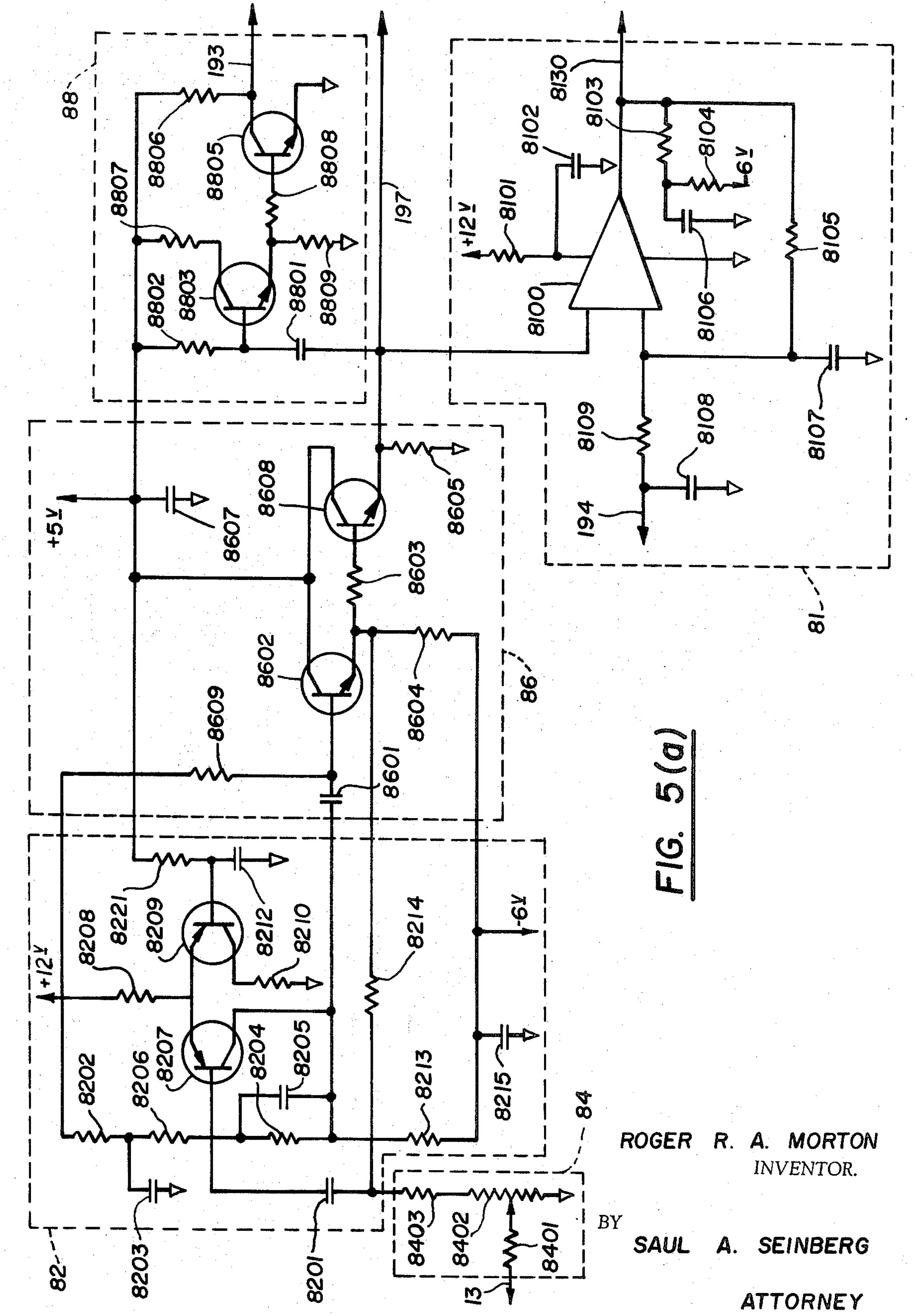
FIGS. 5(a), 5(b) and 5(c) are schematic diagrams of the threshold circuit according to the present invention.

The positive video signal from television camera 10 is fed via line 13 to the impedance matching circuit 84, as shown in FIGS. 2 and 5(a). The impedance matching circuit 84 comprises resistors 8401, 8402 and 8403. It provides an input impedance of approximately 75 ohms. Resistor 8402 is adjustable so that the amplitude of the output of amplifier 82 can be varied. The signal from the impedance matching circuit passes to amplifier 82 via resistor 8403 and capacitor 8201. The amplifying circuit has a low input impedance due to the shunt feedback resistor 8204 connected between the collector and base of transistor 8207 and the further shunt feedback resistor 8214 connected between the emitter of transistor 8207 and the clamping circuit 86. Capacitor 8205 provides the necessary bandwidth limiting capability which is needed in order to improve the signal-to-noise ratio of the signal. Resistors 8202 and 8206 provide biasing current from the +12 volt supply for transistor 8207. Capacitor 8203 acts to decouple the input of amplifier 82 from the +12 volt supply.

In order to obtain proper isolation between amplifier 82 and the +5 volt supply, the emitter of transistor 8207 is stabilized by transistor 8209, the base of which is connected via resistor 8211 to the +5 volt supply. Decoupling from the +5 volt supply is effected by and through capacitor 8212. The output of amplifier 82 appears at and is taken from the collector of transistor 8207 which is connected in a common collector configuration. The output appears across load resistor 8213, and by virtue of the shunt feedback connection of amplifier 82, exhibits a very low output impedance. Capacitor 8215 provides the necessary decoupling for the −6 volt supply to ground.

Signal flow from amplifier 82 to clamping circuit 86 is through coupling capacitor 8001. The clamping circuit is designed to clamp the bottom of the horizontal sync pulse level to a fixed d.c. level. This is done by causing a current flow through resistor 8609 which is in excess of the base current drive required by transistor 8602. This excess current appears across capacitor 8601 causing the base of transistor 8602 to drift slowly positive. However, when the horizontal sync pulses of the composite video signal occur, they cause, as a result of this positive drift which occurs between sync pulses, the base-collector junction of transistor 8602 to become forward biased. This allows the excess charge built up on capacitor 8601 to flow through the base-collector junction of transistor 8602 into the +5 volt supply. The result is a clamping action of the bottom of the horizontal sync pulses which thereby assures that its d.c. level remains constant. Transistor 8608 is employed to provide the necessary isolation for clamping circuit 86. Resistor 8604 provides the necessary bias current for transistor 8602, resistor 8605 serving the same function for transistor 8608. Resistor 8603 insures stability of the isolating transistor 8608. Capacitor 8607 provides decoupling for the +5 volt supply to ground. Consequently, there appears at the output of clamping circuit 86 an amplified and inverted video signal which is driven by a very low impedance. This signal is used by a number of other elements in the threshold circuit 53. One of these is the sync-separator 88.

The amplified and clamped negative video signal passes through capacitor 8801 to the sync-separator clamp comprising resistor 8802 and transistor 8803. Due to the action of current flow passing through resistor 8802, transistor 8803 will turn on at some point on the leading edge of the horizontal sync pulse, thereby causing transistor 8805 to be turned on through resistor 8808. However, should the horizontal sync pulse continue to rise after transistor 8803 is turned on, transistor 8803 may be driven into saturation. An additional voltage of approximately 0.3 volts is required on the base of transistor 8803 to cause it to saturate after transistor 8805 has been turned on. The saturation condition forms a clamping action to insure that excess charge on capacitor 8801 will pass through the emitter of transistor 8803 to the base of transistor 8805, and thence to ground. Thus, sync-separator 88 incorporates within itself a noise margin. The output of sync-separator 88 appears at the collector of transistor 8805 and resistor 8806 which provides the necessary current to pull the collector of transistor 8805 positive when transistor 8805 is turned off.

The purpose of resistor 8807 is to provide and contribute to the noise margin referred to above. While resistor 8809 also contributes to this purpose, its main function is to drain any charge stored in the emitter-base junction of transistor 8805 when it is turned off.

The signal from the sync-separator 86 also passes to comparator 81 through line 197. Comparator 81 comprises an integrated circuit comparator 8100 which serves to compare the voltage between line 197 and line 194, so that if the signal on 197 is significantly more positive than the signal on line 194, the output of the comparator circuit 81 is negative. Besides the integrated circuit comparator 8100, comparator circuit 81 includes decoupling components for the comparator supplies, the +12 volt supply is decoupled by resistor 8101 and capacitor 8102, while the −6 volt supply is decoupled by resistor 8104 and capacitor 8106. Resistor 8103 provides the necessary sinking current for the output of comparator 8100 and resistor 8105, in conjunction with resistor 8109, provides hysteresis in the operation of the comparator in order to insure stability.

Stability is further enhanced by capacitors 8107 and 8108 which serve to remove noise from line 194. Other components of the comparator are found in FIG. 5(b). The function of these components is to act as a buffer between the actual comparator circuit and the points which it must drive. Resistors 8114 and 8115 perform a level change to make the output of the comparator 8100 compatible with gate 8110. The output of gate 8110 drives the maximum and minimum circuits 83 and 85, respectively, with the aid of resistor 8112 which acts as a pull-up resistor. Gate 8110 also drives gate 8111, which in conjunction with the pull-up resistor 8113, drives the automatic threshold network.

A further buffering circuit, whose output is used to provide the drift in the correct direction fo the maximum and minimum circuits 83 and 85, uses transistors 8119 and 8120. The signal comes from the comparator 8100 via line 8130 to resistors 8116 and 8117 which perform a level changing operation for the long tail pair comprising transistors 8119 and 8120. Resistor 8118 forms the tail of this pair and resistors 8123 and 8124 provide the load for the driving transistor 8120. Resistors 8121 and 8122 serve to set the base of transistor 8120 at the correct voltage levels.

Figure 5B:
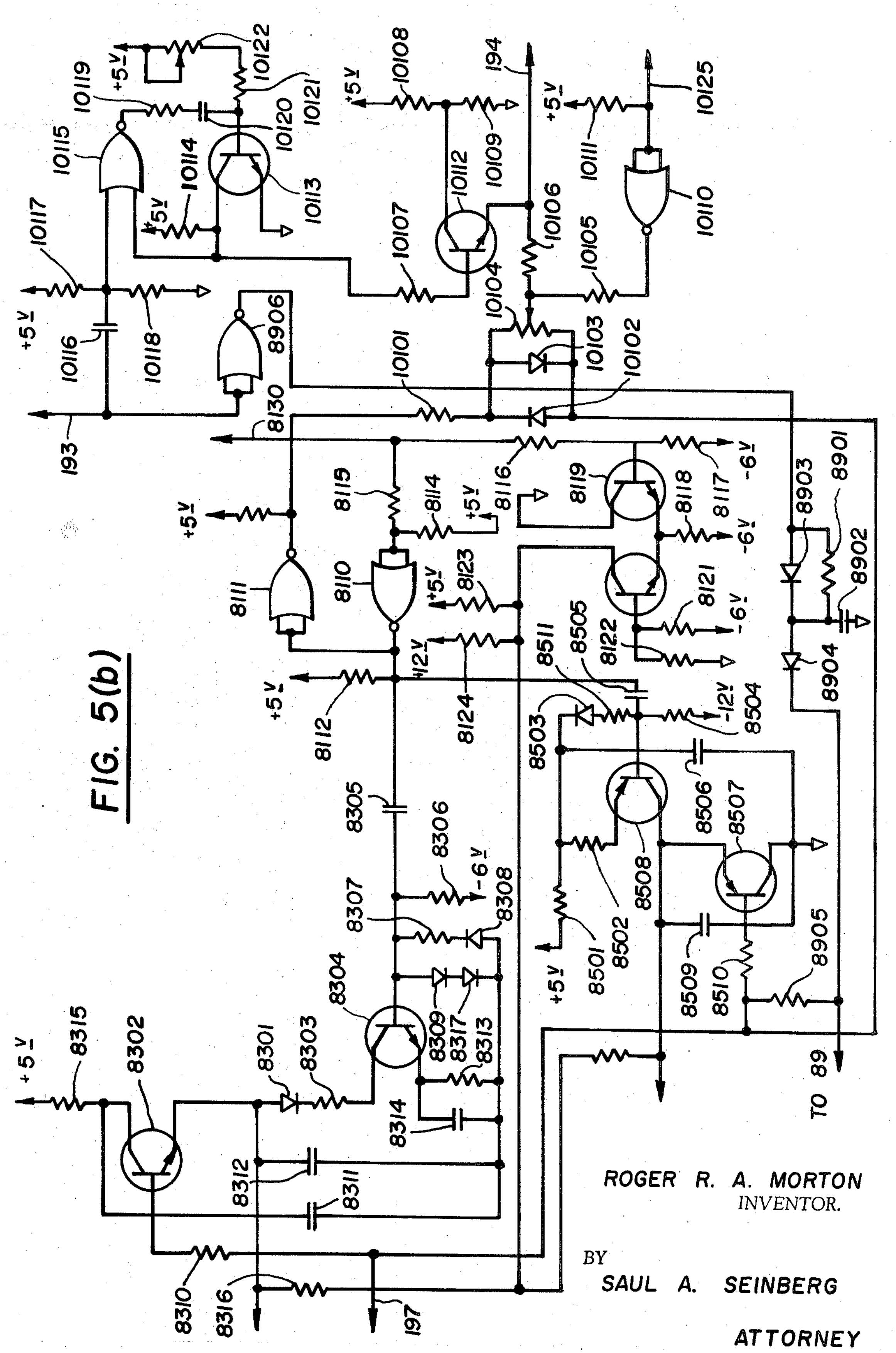

As already discussed, the function of the maximum circuit 83 is to determine the maximum voltage of the video signal and to store that voltage. The maximum circuit 83 also has a resetting input from the comparator 81. Referring to FIG. 5(b), the video signal enters the maximum circuit 83 through resistor 8130 and passes therethrough to the base of transistor 8302 which acts as a detecting diode with a high impedance input. Whenever the voltage on the base exceeds the voltage on the storage capacitor 8312, plus the emitter-base voltage drop of transistor 8302, transistor 8302 charges capacitor 8312 causing its voltage to increase as the video signal on the base of transistor 8302 increases. Once the video signal, as it appears on the base of 8302, is at its maximum, the emitter-base junction of 8302 becomes back-biased and the maximum voltage reached remains stored on capacitor 8312.

The resetting circuit is centered around transistor 8304. A positive-going transition from the output of gate 8110, which is acting as a buffer for comparator 8100, is differentiated by capacitor 8305 to produce a positive spike on the base of transistor 8304. This causes transistor 8304 to be turned on and a large current pulse passes through diode 8301 and resistor 8303 to transistor 8304 and then through the emitter of transistor 8304 to ground, via bypass capacitor 8314. The purpose of the additional components in the discharge path of transistor 8304 is to provide the correct characteristics for a rapid discharge of capacitor 8312. Resistor 8314 provides the path to leak off the charge from bypass capacitor 8314 once the discharge has occurred. Diodes 8309 and 8317 insure that the differentiated pulse from capacitor 8305 does not exceed the voltage necessary to forward-bias these diodes, and resistor 8307, in conjunction with diode 8308, provides the path for capacitor 8305 to rapidly recover from a negative-going transition from gate 8110. Resistor 8306 provides the necessary bias to keep transistor 8304 turned off when the output of gate 8110 is steady. Resistor 8315, in conjunction with capacitor 8311, provides necessary decoupling to isolate the +5 volt supply line from the high current pulses which occur in the circuit.

Resistor 8316 which connects to the collector of transistor 8120, provides for a slight drift, with stored maximum voltage on capacitor 8312. The direction of this drift depends on the state of comparator 8100 and it insures that the voltage computed from the output of the maximum circuit 83 and the minimum circuit 85 by summing junction 87, does not accidentally intercept the delayed video signal in images which exhibit considerable shading.

The minimum circuit works in much the same way as the maximum circuit, except that the polarity is reversed. The video signal comes in one line 197 through resistor 8510 to the base of transistor 8507. Whenever the voltage at the base of 8507 falls below the voltage on capacitor 8509 less the forward-bias of the emitter to base voltage of transistor 8507, transistor 8507 draws charge off capacitor 8509 and pulls it down to the voltage of the video less the forward-bias voltage drop of the emitter-base junction. Resetting is performed by transistor 8508 receiving a negative-going pulse on its base as a result of a negative transition from gate 8110. This negative-going pulse turns on transistor 8508 causing a large discharge current to flow from capacitor 8509 to the collector of transistor 8508 and out through the emitter resistor 8502. Resistor 8511 connected in series with diode 8503 provides the recovery path or the charge from capacitor 8505 when a positive-going transition appears at the output of gate 8110. Resistor 8504 provides the bias necessary to turn transistor 8508 off when no transitions are appearing from gate 8110. Resistor 8501 in conjunction with capacitor 8506 provides the necessary decoupling from the +5 volt line so that the large current pulses are isolated from this supply.

The function of delay line 89 is to provide the necessary delay of the video signal so that the maximum and minimum points of a transition can be obtained and their weighted average calculated before the transition reaches the comparator circuit 90. Delay line 89 is driven from the video signal line 197 through the impedance matching resistor 8905. The network comprising diodes 8903 and 8904, resistor 8901 and capacitor 8902 serves to inject some of the horizontal sync pulses into the delay line for later use in the rest of the circuit.

The automatic threshold network 101 controls the input line 194 to comparator 81 when the system is in the automatic mode. The automatic network 101 receives the signal from comparator 81 through gates 8110 and 8111 which, in conjunction with pull-up resistor 8113, drives the offset network comprising resistor 10101, diodes 10102, and 10103 and potentiometer 10104. This network is connected to the video signal line 197. It provides a voltage for the input to comparator 8100 through line 194, a voltage which is offset from the video signal by an amount determined by potentiometer 10104, from the video signal line 197. The direction of this offset is determined by the state of comparator 81 and adds to the condition of the output of gate 8111. An additional slight offset is provided by transistor 10112 when it is connected through gate 10110 and pull-up resistor 10111 to the white/black particle line coming from threshold circuit 92. This additional offset enables the automatic threshold network 101 to show a slight preference for trailing edges of particles rather than leading edges and therefore insures that if the automatic threshold network picks up a leading edge, it does not miss out on the trailing edge and assume the particle continues right to the end of that scan line.

In order to preset the threshold circuit in its correct initial condition at the beginning of a scan line, incoming line 194 to comparator 8100 is initially connected by transistor 10112 to a fixed voltage determined by resistor divider 10108 and 10109. This condition is caused by the voltage coming from the collector of transistor 10113. Driving transistor 10112 through resistor 10107 causes the turn-on period to last for the first few microseconds of the scan and serves to change capacitor 8108 to the correct initial level.

The timing circuit operates off the horizontal sync line 193. Capacitor 10116 provides a positive pulse in response to the rising trailing edge of the horizontal sync pulse. This pulse, in turn, drives the output of gate 10115 negative which tends to turn off transistor 10113 through resistor 10119 and capacitor 10112. Transistor 10113 remains off until the current flowing through variable resistor 10122 and fixed resistor 10112 increases the voltage on the base of transistor 10113 sufficiently to turn the transistor on. Thus, during the time that transistor 10113 is off, its collector is positive which holds gate 10115 on and produces the positive pulse to turn transistor 10112 on resistor 10107. Resistor 10114 causes the voltage at the collector of 10113 to go positive when this transistor is turned off.

Resistors 10117 and 10118 serve to set the voltage at the input gate 10115 to the correct level in the quiescent state. Resistor 10106, in conjunction with capacitor 8108, serves to delay the offsetted video signal generated by potentiometer 10104, in conjunction with the associated diode network, comprising diodes 10102 and 10103, as it flows to the input of comparator 8100 through line 194.

Figure 5C:
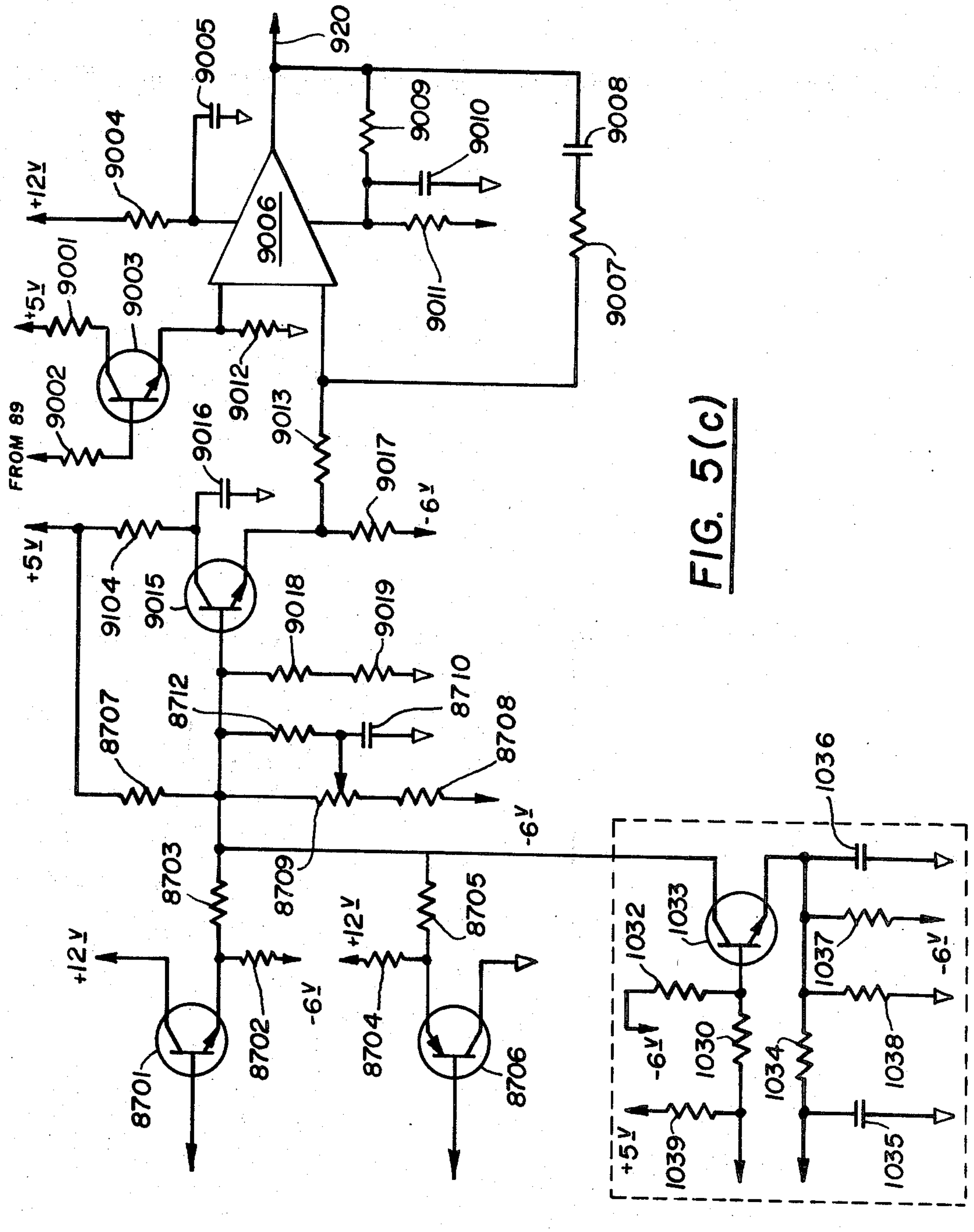

The function of the summing circuit 87 is to "sum" the outputs of the maximum and minimum circuits 83 and 85 and determine a predetermined weighted average thereof. A further division by 2 results as the signal is passed to comparator 90. The signal from the maximum circuit 83, as shown in FIG. 5(c), enters the base of transistor 8701 which acts as an emitter follower, biased by resistor 8702, into the summing network 8703. The signal from the minimum network 85 enters the base of transistor 8706 and acts as a complimentary emitter follower biased by resistor 8704 which drives the summing network resistor 8705. Summing network resistor 8712 provides an initial division and can also introduce an adjustable offset by virtue of being connected to potentiometer 8709 which, in turn, is connected through voltage divider resistor 8707 to the positive supply and resistor 8708 to the negative supply. This point forms the output to the comparator circuitry 90.

The comparator circuitry 90 receives the signal from the summing network 87 and passes it to transistor 9015. This transistor is connected as an emitter follower and has in input resistor network 9018 and 9019 which compensates for attenuation of the video signal by delay line 89. The collector of transistor 9015 is isolated from the +5 volt supply by resistor 9014 and capacitor 9016. The biasing current is provided through load resistor 9017. The output at this stage passes through resistor 9013 to the comparator 9006. Resistor 9013, in conjunction with resistor 9007 and capacitor 9008, introduce hysteresis thereby assuring stability of operation of the comparator 9006. The other input of the comparator circuit 90 is from the output of the delay line 89. This enters through resistor 9002 to an emitter follower 9003. The collector is connected to the positive supply through resistor 9001. Resistor 9012 provides the necessary biasing current and inputs to the integrated circuit comparator 9006. The positive supply for the comparator 9006 is decoupled through resistor 9004 and capacitor 9005. The negative supply is similarly decoupled via resistor 9011 and capacitor 9010. Resistor 9009 provides the necessary sinking current to enable the comparator to drive the black/-white logic circuitry 91.

In the manual mode it is necessary to introduce into comparator circuit 90, the d.c. voltage selected by the operator through adjustment of the the threshold control 92. This voltage is introduced, instead of the output of the summing circuit 87. In order to do this, a voltage appears from the control 92, via line 1031 and turns on transistor 1033 through resistor 1030. As a result, the voltage selected by the potentiometer 9203, is divided by 2 in resistor 1034 and 1038 to control the emitter voltage of transistor 1033. Because of the low impedance of resistors 1034 and 1038 it is found that when transistor 1033 is turned on, it appears as a voltage source and dominates the input signals coming from the maximum and minimum circuits 83 and 85 through resistors 8703 and 8705.

Line 8714 is brought under the control of the signal from the potentiometer 9203 and the signals from the maximum and minimum circuit have no effect. Other resistors in this manual-automatic switching network are 1039, which provides the pull-up necessary to turn on transistor 1033, and resistor 1032, which insures that transistor 1033 is turned off when the signal from the control 92 on 1033 is in the zero state. Resistor 1037 is used to compensate for the forward saturation voltage of transistor 1033. Capacitors 1035 and 1036 remove any noise that may appear on the line coming from the control 92 to pin 8.

Figure 6:
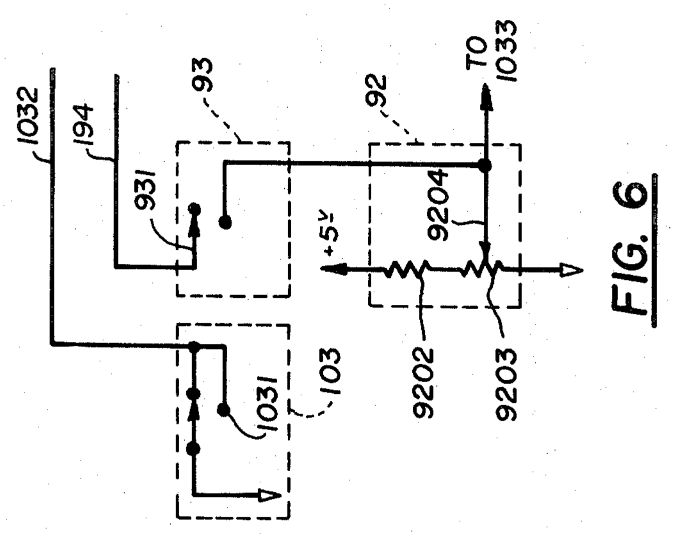
FIG. 6 is a schematic representation of the switching action occurring within the threshold circuit of FIGS. 2 and 5.

The following components which comprise the remainder of elements in the threshold circuit 53 are shown in FIG. 6. Switch 1031 disables the manual switching circuit 103 in the automatic and semi-automatic modes by opening line 1032. Switch 931 connects line 194 to the wiper of threshold potentiometer 9203 in the semi-automatic mode. This connection dominates the effects of the automatic threshold network 101 and insures that line 194 is under the control of potentiometer 9203. The wiper arm 9204 of threshold potentiometer 9203 is connected to resistor 1034 in order to control the emitter voltage of transistor 1033 in the automatic threshold network 101.

The binary video signal which exits comparator 91 may be, as previously noted, either positive or negative depending upon the relative shading or "color" between the particles being scanned and the background. Consequently, in order to simplify operation of the remainder of the particle measuring system, logic circuitry, the black and white logic 91, is provided to maintain the binary video signal exiting the threshold circuit 53 in its desired state. When "white" particles on a "black" background are being scanned, the resultant binary video signal is either positive or zero and in its correct state insofar as the measuring system is concerned. However, when "black" particles on a "white" background are measured, the resulting binary video signal is reversed. To overcome this problem, a switch (not shown) is provided for activating the black and white logic 91 when the latter situation occurs.

The black and white logic 91, when operable, reverses the binary video signal resulting from scanning "black" particles on a "white" background. This maintains the state of the binary video signal constant and greatly simplifies the handling of the binary video signal throughout the particle measuring system.

Figure 7:
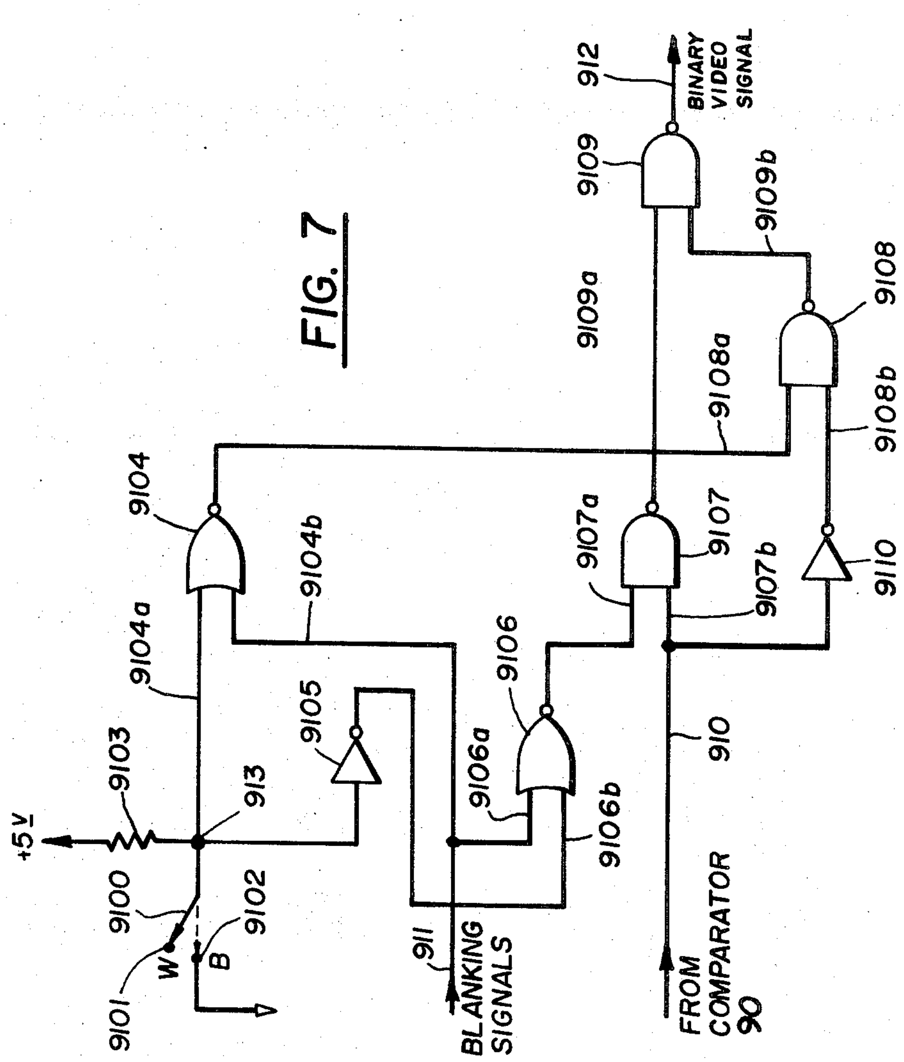
FIG. 7 is a logic diagram of the black and white logic shown in FIG. 2.

The black and white logic 91 is shown in detail in FIG. 7. Switch 9100, which is located for convenience's sake on the front panel of the instrument and is operator actuated, is shown connected or thrown to the "white" terminal 9101. In this position, switch 9100 has been set to accommodate the black and white logic 91 for the measurement of "white" particles on a "black" background. Resistor 9103, which is connected to the +5 volt supply, serves to limit the input signal on line 9104*a* to NOR gate 9104 to a proper level. By virtue of this connection, and with switch 9100 set to terminal 9101, the input to gate 9104 via line 9104*a* is always positive or "up." Consequently, the output from gate 9104 is always zero or "down," as is the input line 9108*a* to NAND gate 9108. Due to the action of inverter 9105, input line 9106*b* is always "down" as is input line 9106*a* during the period of scan. Consequently, during any one line scan, with switch 9100 in its "white" position, the output of NOR gate 9106 is always "up" causing input line 9107*a* of NAND gate 9107 to be "up". If, during any line scan a particle is encountered, line 910 and input line 9107*b* will be "up" resulting in the output of gate 9107 being switched "up." At the same time, input line 9109*a* of NAND gate 9109 is set "up." Since input line 9108*a* is always "down" under the stated conditions, the output of gate 9108 and input line 9109*b* to NAND gate 9109 is always "up." Thus, during those periods when a particle is being scanned, input line 9109*b* is always "down" and input line 9109*a* is always "up" causing a positive output from gate 9109. When, during a line scan, no portion of a particle is encountered, input line 9109*a* goes "up" setting the output of gate 9109 "down." Thus, with switch 9100 set to its white position 9101, the output from the black and white logic 91 corresponds in phase to the input from comparator 90.

When a blanking signal is received by the black and white logic 91 at the end of each line scan, input line 9106*a* goes "up" setting the output of gate 9106 "down." This, in turn, insures that the output of gate 9107 is set "up" thereby causing the output of gate 9109 to be set "down." As a result, there is no chance that a spurious signal will appear on line 912.

If a "black" particle on a "white" background is to be measured, switch 9100 is set to black terminal 9102, shown as a dashed line in FIG. 7. This setting causes input line 9104*a* to always be "down" since node 913 is pulled down to zero potential when switch 9100 is set to its "black" position. In the absence of any blanking signal on line 911, that is, during a line scan within the frame, the output of gate 9104 is "up", as is the input line 9108*a*. The output of gate 9106, due to the above-noted setting of switch 9100, is "down," which causes input line 9107*a* to be "down." Consequently, the output of gate 9107 and input line 9109*a* are both "up." When a "black" particle or any portion thereof is traversed by camera 10, input line 9108*b* is set "up" by the action of inverter 9110 on the "down" signal received via line 910 from comparator 90. Since only input line 9109*a* to gate 9108 is now "up," its output is "up." When only the "white" background is traversed during a line scan within the frame, input line 9109*b* is set "up" which switches the output of gate 9109 "down." Thus, with switch 9100 properly set, the binary video signal exiting the black and white logic 91 is "up" whenever a particle or any portion thereof is traversed and "down" whenever the background only is traversed regardless of the relative color of the particulate sample and background.

It will be understood and appreciated that many changes can be made in the preferred embodiment described herein and that, further, alternate means of implementation thereof are possible and within the skill of those familiar with the art. Consequently, while the present invention has been described by way of specific examples, it is not to be solely limited thereto, except as defined by the appended claims.

I claim:

1. In a particulate measuring system wherein a video signal having sloping transitions is generated by scanning a represented sample with a television camera, a threshold circuit for converting said video signal to a binary video signal having sharply defined transitions corresponding substantially with the particle boundaries of the represented sample being scanned, comprising:

a. adjustable threshold control circuit means for generating a first image intensity reference level signal;

b. an automatic threshold network for generating a second image intensity reference level signal;

c. first comparator circuit means connected to receive said video signal and said first and second image intensity reference level signals for comparing said video signal with either of said first or second image intensity reference level signals and including means for generating a first output signal whenever said video signal exceeds whichever one of said image intensity reference level signals with which it has been compared and a second output signal whenever said video signal does not, said first or second output signals being fed back to said automatic threshold network;

d. first circuit means responsive to said video signal and said output signals of said first comparator circuit means for determining and storing the maximum value reached by said video signal between transitions of said otuput signals of said first comparator circuit means;

e. second circuit means responsive to said video signal and said output signals of said first comparator circuit means for determining and storing the minimum value reached by said video signal between transitions of said output signals of said first comparator circuit means;

f. signal summing network means connected to said first and second circuit means and responsive thereto for determining a predetermined weighted average of said maximum and minimum values of said video signal reached between transitions of said output signals of said first comparator circuit means;

g. signal delay means receiving said video signal for delaying said video signal for a period of time equal to the time required by said first and second circuit means and said summing network to determine in concert the weighted average of said maximum and minimum values reached by said video signal between transitions of said output signals of said first comparator circuit means;

h. second comparator circuit means connected to receive said delayed video signal, said first image intensity reference level signal and said weighted average signal for comparing said delayed video signal with said first image intensity reference level signal or said weighted average signal and including means for generating a binary video signal having a first state whenever said delayed video signal exceeds the signal with which it has been compared and a second state whenever said delayed video signal does not; and i. switching means for connecting said adjustable threshold control circuit means or said automatic threshold network to said first comparator circuit means and including means for connecting said adjustable threshold control circuit means or said signal summing network means to said second comparator circuit means.

2. The threshold circuit, according to claim 1, which further comprises:

a. logic circuit means connected to said second comparator circuit means for constantly maintaining said binary video signal in one of its two said states regardless of whether said represented particulate sample comprises "white" particles on a "black" background or vice versa; and b. switching means for enabling or disenabling said logic circuit means as the relative color of said represented particulate sample and its background dictates.

3. The threshold circuit, according to claim 2, wherein said adjustable threshold control circuit means comprises a manually adjustable potentiometer.

4. The threshold circuit, according to claim 1, wherein said adjustable threshold control circuit means comprises a manually adjustable potentiometer.

5. The threshold circuit, according to claim 4, which further comprises:

a. amplifying circuit means for amplifying said video signal;

b. an impedance matching circuit connected between said amplifying means and said television camera for matching said camera and said threshold circuit; and c. clamping circuit means connected to said amplifying means for clamping the bottom of the horizontal sync pulses of said amplified video signal to a fixed d.c. level before its introduction into the remainder of said threshold circuit.

6. The threshold circuit, according to claim 1, which further comprises:

a. amplifying circuit means for amplifying said video signal;

b. an impedance matching circuit connected between said amplifying means and said television camera for matching said camera and said threshold circuit; and c. clamping circuit means connected to said amplifying means for clamping the bottom of the horizontal sync pulses of said amplified video signal to a fixed d.c. level before its introduction into the remainder of said threshold circuit.

7. The threshold circuit, according to claim 6, which further comprises:

a. logic circuit means connected to said second comparator circuit means for constantly maintaining said binary video signal in one of its two said states regardless of whether said represented particulate sample comprises "white" particles on a "black" background or vice versa; and b. switching means for enabling or disenabling said logic circuit means as the relative color of said represented particulate sample and its background dictates.

8. The threshold circuit, according to claim 7, wherein said adjustable threshold control circuit means comprises a manually adjustable potentiometer.

9. In a particulate measuring system wherein a video signal having sloping transitions is generated by scanning a represented sample with a television camera, a threshold circuit for converting said video signal to a binary video signal having sharply defined transitions corresponding substantially with the particle boundaries of the represented sample being scanned, comprising:

adjustable threshold control circuit means for generating an image intensity reference level signal;

first comparator circuit means connected to receive said video signal and said image intensity reference level signal for comparing said video signal with said image intensity reference level signal and including means for generating a first output signal whenever said video signal exceeds said image intensity reference level signal with which it has been compared and a second output signal whenever said video signal does not;

first circuit means responsive to said video signal and said output signals of said first comparator circuit means for determining and storing the maximum value reached by said video signal between transitions of said output signals of said first comparator circuit means;

second circuit means responsive to said video signal and said output signals of said first comparator circuit means for determining and storing the minimum value reached by said video signal between transitions of said output signals of said first comparator circuit means; output signals of said first signal summing network means connected to said first and second circuit means and responsive thereto for determining a predetermined weighted average of said maximum and minimum values of said video signal reached between transitions of said output signals of said first comparator circuit means;

signal delay means receiving said video signal for delaying said video signal for a period of time equal to the time required by said first and second circuit means and said summing network to determine in concert the weighted average of said maximum and minimum values reached by said video signal between transitions of said output signals of said first comparator circuit means; and second comparator circuit means connected to receive said delayed video signal and said weighted average signal for comparing said delayed video signal with said weighted average signal and including means for generating a binary video signal having a first state whenever said delayed video signal exceeds the signal with which it has been compared and a second state whenever said delayed video signal does not.

10. The threshold circuit as defined in claim 9, wherein the second comparator circuit means is additionally connected to receive the image intensity reference level signal for comparing said delayed video signal with said image intensity reference level signal or said weighted average signal for the included means to generate a binary video signal having a first state whenever said delayed video signal exceeds a signal with which it has been compared and a second state whenever said delayed video signal does not.

11. In a particulate measuring system wherein a video signal having sloping transitions is generated by scanning a represented sample with a television camera, a threshold circuit for converting said video signal to a binary video signal having sharply defined transitions corresponding substantially with the particle boundaries of the represented sample being scanned, comprising:

an automatic threshold network for generating an image intensity reference level signal;

first comparator circuit means connected to receive said video signal and said image intensity reference level signal for comparing said video signal with said image intensity reference level signal and including means for generating a first output signal whenever said video signal exceeds said image intensity reference level signal with which it has been compared and a second output signal whenever said video signal does not, said first or second output signals being fed back to said automatic threshold network;

first circuit means responsive to said video signal and said output signals of said first comparator circuit means for determining and storing the maximum value reached by said video signal between transitions of said output signals of said first comparator circuit means;

second circuit means responsive to said video signal and said output signals of said first comparator circuit means for determining and storing the minimum value reached by said video signal between transitions of said output signals of said first comparator circuit means;

signal summing network means connected to said first and second circuit means and responsive thereto for determining a predetermined weighted average of said maximum and minimum values of said video signal reached between transitions of said output signals of said first comparator circuit means;

signal delay means receiving said video signal for delaying said video signal for a period of time equal to the time required by said first and second circuit means and said summing network to determine in concert the weighted average of said maximum and minimum values reached by said video signal between transitions of said output signals of said first comparator circuit means; and second comparator circuit means connected to receive said delayed video signal and said weighted average signal for comparing said delayed video signal with said weighted average signal and including means for generating a binary video signal having a first state whenever said delayed video signal exceeds the signal with which it has been compared and a second state whenever said delayed video signal does not.

12. In a system for measuring represented objects by generating a video signal having a profile as a function of the response of each represented object along each one of a plurality of scanning tracks across each represented object, the video signal profile having sloping transitions, a threshold device for generating a switch signal having transitions occurring as a function of the profile of each sloping transition of the video signal, comprising: network means including a filtering circuit and offset-voltage generator means for generating an offset-voltage signal, said network means receiving the video signal for generating through the filtering circuit a modified video signal as a function of the video signal and the offset-voltage signal, where the offset-voltage signal has a polarity determined by the state of a switch signal generated by a further included comparison means receiving the video signal and the modified video signal for generating the switch signal having one state if the value of the modified video signal exceeds the value of the video signal and having another state if the value of the modified video signal is less than the value of the video signal.

13. In a system for measuring represented objects by generating a video signal having a profile as a function of the response of represented objects along scanning tracks across the represented objects, the video signal profile having sloping transitions, a threshold device for generating a switch signal having transitions occurring as a function of the profile of each sloping transition of the video signal, comprising:

filtering means receiving the video signal to generate a filtered signal as a function of the video signal;

comparison means to generate a switch signal having a first condition if the filtered signal has a value which exceeds the video signal value by an amount at least equal to an offset signal and having a second condition otherwise, which offset signal is a function of the switch signal;

first circuit means responsive to said video signal and said switch signal for determining and storing the maximum value reached by said video signal between transitions of said switch signal;

second circuit means responsive to said video signal and said switch signal for determining and storing the minimum value reached by said video signal between transitions of said switch signal;

signal summing network means connected to said first and second circuit means and responsive thereto for determining a predetermined weighted average of said maximum and minimum values of said video signal reached between transitions of said switch signal;

signal delay means receiving said video signal for delaying said video signal for a period of time equal to the time required by said first and second circuit means and said summing network to determine in concert the weighted average of said maximum and minimum values reached by said video signal between transitions of said switch signal; and first comparator circuit means connected to receive said delayed video signal and said weighted average signal for comparing said delayed video signal with said weighted average signal and including means for generating a binary video signal having a first state whenever said delayed video signal exceeds the signal with which it has been compared and a second state whenever said delayed video signal does not.

14. In a system for measuring represented objects by generating a video signal having a profile as a function of the response of the represented object along scanning tracks across the represented objects, the video signal profile having sloping transitions, a threshold circuit for generating a switch signal having transitions occurring as a function of the profile of each sloping transition of the video signal, comprising:

filtering means receiving the video signal to generate a filtered video signal;

switching means for receiving the filtered video signal to generate a switch signal having a first condition when the filtered video signal exceeds an offset signal and a second condition otherwise, which offset signal is a function of the switch signal;

first circuit means responsive to said video signal and said switch signal for determining and storing the maximum value reached by said video signal between transitions of said switch signal;

second circuit means responsive to said video signal and said switch signal for determining and storing the minimum value reached by said video signal between transitions of said switch signal;

signal summing network means connected to said first and second circuit means and responsive thereto for determining a predetermined weighted average of said maximum and minimum values of said video signal reached between transitions of said switch signal;

signal delay means receiving said video signal for delaying said video signal for a period of time equal to the time required by said first and second circuit means and said summing network to determine in concert the weighted average of said maximum and minimum values reached by said video signal between transitions of said switch signal; and first comparator circuit means connected to receive said delayed video signal and said weighted average signal for comparing said delayed video signal with said weighted average signal and including means for generating a binary video signal having a first state whenever said delayed video signal exceeds the signal with which it has been compared and a second state whenever said delayed video signal does not.

* * * * *

UNITED STATES PATENT OFFICE
CERTIFICATE OF CORRECTION

Patent No. 3,763,357 Dated October 2, 1973

Inventor(s) ROGER R. A. MORTON

It is certified that error appears in the above-identified patent and that said Letters Patent are hereby corrected as shown below:

Column 10, line 6, change "or" to -- for --;
Column 11, line 37, change "in" to -- an --;
Column 16, line 23, delete "output signals of said first".
Column 16, line 22, before "first" -- output signals of said-- should be inserted.

Signed and sealed this 26th day of March 1974.

(SEAL)
Attest:

EDWARD M.FLETCHER,JR.
Attesting Officer

C. MARSHALL DANN
Commissioner of Patents

USCOMM-DC 60376-P69
☆ U.S. GOVERNMENT PRINTING OFFICE : 1969 O—366-334